United States Patent [19]

Piesik

[11] Patent Number: 4,685,533
[45] Date of Patent: Aug. 11, 1987

[54] EXHAUST DISSIPATOR DEVICE
[75] Inventor: Edward T. Piesik, Pomona, Calif.
[73] Assignee: General Dynamics, Pomona Division, Pomona, Calif.
[21] Appl. No.: 814,139
[22] Filed: Dec. 27, 1985
[51] Int. Cl.[4] .............................................. F02K 1/44
[52] U.S. Cl. .................................. 181/213; 181/239; 181/269
[58] Field of Search .............. 181/213, 217, 222, 239, 181/267, 268, 269

[56] References Cited

U.S. PATENT DOCUMENTS

| | | | |
|---|---|---|---|
| 675,830 | 6/1901 | Gray | 181/267 |
| 794,226 | 7/1905 | Ihrig et al. | 181/239 X |
| 1,128,306 | 2/1915 | Goelzer | 181/267 |
| 2,069,751 | 2/1937 | Couch et al. | 181/267 |
| 2,234,612 | 3/1941 | Wold | 181/267 |
| 2,654,437 | 10/1953 | Woods | 181/239 |
| 2,716,463 | 8/1955 | Latulippe | 181/267 |
| 2,807,329 | 9/1957 | Caldwell | 181/267 |
| 2,936,846 | 5/1960 | Tyler et al. | 181/217 |
| 2,957,537 | 10/1960 | Morgan | 181/217 |
| 2,979,151 | 4/1961 | Blackwell et al. | 181/217 |
| 3,157,029 | 11/1964 | Greene | 60/263 X |
| 3,286,786 | 11/1966 | Wirt | 181/213 |
| 4,180,141 | 12/1979 | Judd | 181/217 X |

FOREIGN PATENT DOCUMENTS

| | | | |
|---|---|---|---|
| 393884 | 4/1924 | Fed. Rep. of Germany | 181/267 |
| 22089 | of 1907 | United Kingdom | 181/267 |

Primary Examiner—Benjamin R. Fuller
Attorney, Agent, or Firm—Neil F. Martin; Edward B. Johnson

[57] ABSTRACT

An exhaust dissipator device for a rocket exhaust has an inlet for connection to the exhaust and a plurality of smaller exhaust orifices spaced around its surface to dissipate the flow into a plurality of smaller jets. A deflector surface in the direction of exhaust flow into the container acts to further dissipate the flow and deflect it out of its original path. This may comprise an internal surface of the container, or a separate deflector plate spaced from the container surface.

7 Claims, 4 Drawing Figures

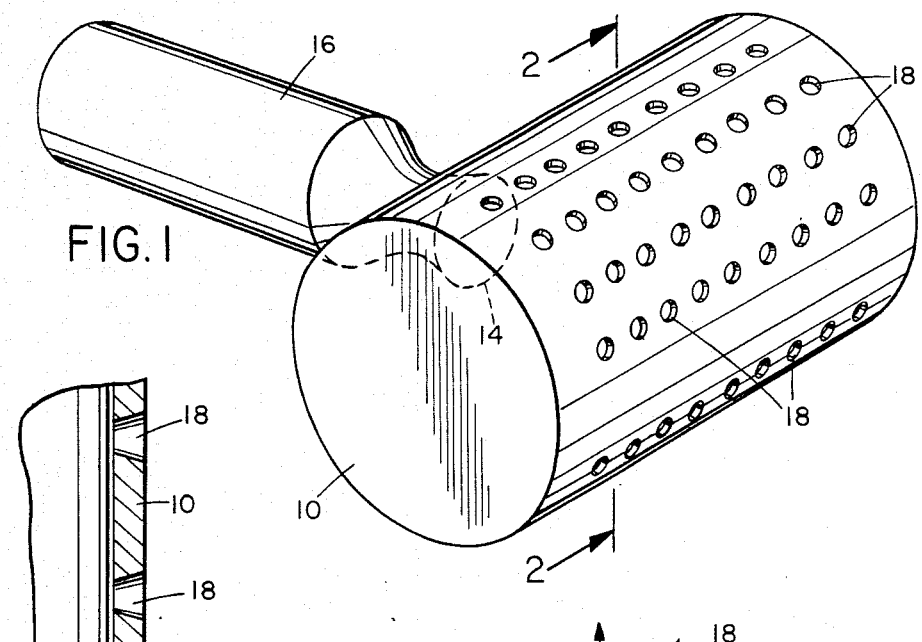
FIG. 1
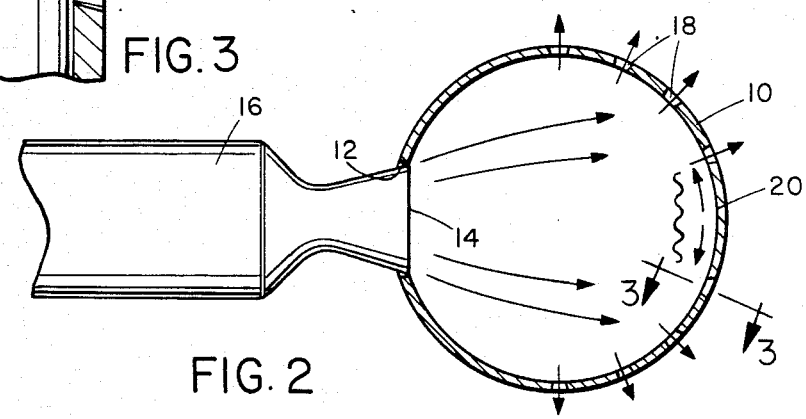
FIG. 3
FIG. 2
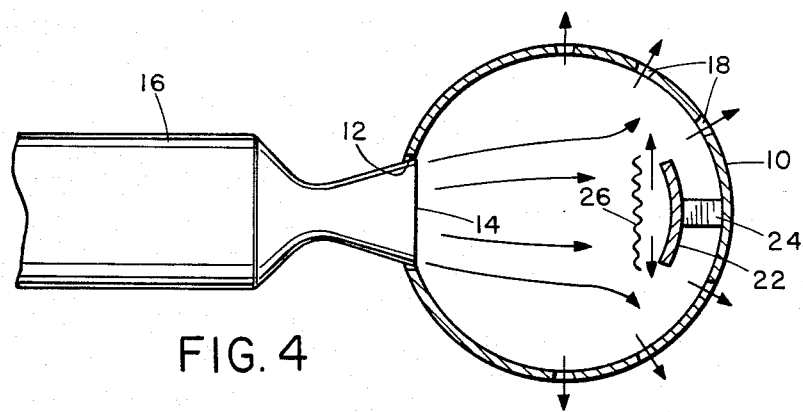
FIG. 4

EXHAUST DISSIPATOR DEVICE

BACKGROUND OF THE INVENTION

The present invention relates to an exhaust dissipator device, particularly intended for use on rocket motor exhausts, for dissipating the exhaust flow to reduce the thermal and pressure effects on adjacent surfaces.

Rocket exhausts typically comprise a single concentrated supersonic flow which can cause damage to adjacent surfaces as a result of pressure and heating from impingement by the exhaust flow.

Sound suppressing devices for such exhausts have been proposed in the past. For example, in U.S. Pat. No. 2,957,537 of Morgan, a sound suppressor for an aircraft jet engine is shown. The suppressor comprises a series of expansion nozzles for reducing the noise and heat of exhaust gases.

Mufflers or silencers are also shown for use on the exhausts of automobiles and the like. These generally operate by retarding the escape of exhaust gases, but there are problems in ensuring that the retardation does not cause significant back pressure which could affect operation of the motor.

In U.S. Pat. No. 675,830 of Gray, for example, a steam muffler is shown which comprises two concentric cylindrical chambers into which the exhaust projects. Each chamber has a series of openings to allow exhaust gases to escape in various directions, thus retarding the flow and reducing noise.

SUMMARY OF THE INVENTION

According to the present invention, an exhaust dissipator device for a rocket exhaust is provided, which comprises a container having an inlet for connection to a rocket exhaust with a deflector surface in the container directly opposite the inlet to deflect incoming exhaust flow in a direction generally normal to the path of incoming exhaust gas. The container has a series of exhaust orifices spaced around it of smaller dimensions than the inlet for exhaust flow out of the container in a plurality of different directions.

The exhaust orifices are preferably all nozzles which expand outwardly from the container so as to introduce an enhanced thrust in opposition to the rearward load on the device due to the impingement of the exhaust flow on the wall of the container.

The total area of the exhaust orifices is large enough so that the internal pressure of the container is sufficiently low that it does not significantly effect the critical flow from the rocket nozzle. The total area is chosen such that the internal pressure is less than about half of the rocket motor chamber pressure.

The deflector surface may simply be a portion of the container wall directly opposite the inlet or, alternatively, a separate deflector may be mounted spaced from the container wall opposite the inlet. The deflector surface acts to dissipate the original exhaust flow to increase dissipation in the container, and also to cause the exhaust gases to distribute more uniformly into the volume on the container and out through the exhaust orifices.

The deflector surface and all internal surfaces of the container may be coated with ablative material to protect them from impingement heating.

BRIEF DESCRIPTION OF THE DRAWINGS

A better understanding of the present invention will be provided by consideration of the following description, taken in conjunction with the accompanying drawings, in which like reference numerals refer to like parts, and in which:

FIG. 1 is a perspective view of a rocket attached to an exhaust dissipator;

FIG. 2 is a sectional view taken on line 2—2 of FIG. 1, showing the exhaust flow pattern;

FIG. 3 is an enlarged sectional view taken on line 3—3 of FIG. 2; and

FIG. 4 is a view similar to FIG. 2, with an exhaust deflector added.

DESCRIPTION OF THE PREFERRED EMBODIMENTS

As shown in FIGS. 1 and 2 of the drawings, an exhaust dissipator device according to a preferred embodiment of the present invention comprises a cylindrical container 10 having an inlet 12 for connection to the exhaust 14 of a rocket motor 16. As shown the exhaust flow is directed generally radially into the container.

The container has a plurality of exhaust orifices 18 spaced around its cylindrical periphery. In FIG. 1 the orifices 18 are in spaced rows, but other arrangements are possible. The orifices may be of any suitable peripheral shape, but circular orifices are preferred.

In the preferred embodiment shown in FIG. 1 the container is cylindrical. However, other shapes may be used, with the preferred shapes being those which minimize the volumetric dimensions behind the rocket, particularly in the rocket axis rearward direction, while having sufficient surface area to accommodate the desired number of exhaust orifices.

The concentrated supersonic exhaust flow from the rocket exhaust will enter the container in the rocket axis rearward direction, and will tend to dissipate in the container and be directed outwardly through the various exhaust orifices in numerous smaller jets.

The number of exhaust orifices if chosen so that the single exhaust is dissipated into a sufficient number of smaller jets to reduce the impingement effects sufficiently. The impingement effects from a small nozzle are much less than those from a larger nozzle, given the same propellant source and geometric similarity.

At the same time, the total flow area of the exhaust orifices must be large enough to ensure that the internal pressure in the container is low enough to have no effect on the critical flow from the rocket nozzle. An internal back pressure is desirable so that the total flow area of all the exhaust orifices does not have to be excessive. The internal pressure must be less than about half of the rocket chamber pressure, so that it has no effect on the critical flow.

In the embodiment shown in FIGS. 1 and 2, portions of the inner wall of the container opposite exhaust inlet 12 act as a solid deflector surface 20. The original exhaust flow in the rocket axis direction will retain some concentration as it reaches surface 20, and this surface will act to further dissipate the original flow in a direction generally normal to the rocket axis, tending to distribute the exhaust gases more uniformly into the volume of the device and through the orifices, reducing the potential pressure of the exhaust flow.

As best shown in FIG. 3, each exhaust orificie comprises a nozzle with a tapered or part-conical wall which increases in diameter in the flow direction outwardly from the interior of the container. This introduces an enhanced thrust acting in opposition to rearward load on the device as a result of the impingement of the exhaust flow on the inner wall of the container.

For each orifice, the thrust $F_o$ opposing the rearward load is given by $$F_o = P\text{int} * A_o * cf \qquad (1)$$

where Pint is the average internal pressure in the container, $A_o$ is the orifice inner area, and Cf is the thrust coefficient.

The rearward thrust $F_I$ on the device caused by impingement of deflector surface 20 is given by:

$$F_I = Pt * A \qquad (2)$$

where Pt is the recovery pressure behind the normal shock wave introduced into the exhaust flow by the deflector surface, and A is the impingement area on the wall of the container.

Thus the opposing thrusts acting on the device can be determined from equations (1) and (2) above, with the sum of all the flow vectors from all of the orifices dictating the final direction of the load on the device. The load may be arranged to be positive or negative in any desired direction by suitable arrangement of the position, size and number of exhaust orifices.

Thus the device shown in the drawings will dissipate the singular exhaust plume concentration from a rocket exhaust by converting it into many smaller jets pointing in different directions. The exhaust pressure and thermal impingement effect will thus be reduced significantly, since the impingement effects will be much less from a small nozzle than from a large nozzle given the same propellant source and geometric similarity.

Such an exhaust dissipator device is particularly important in rocket exhausts, since the impingement effects of such exhaust flows extend well beyond the nozzle exit plane because of the concentrated supersonic flow exhibit by the exhaust plume.

The deflector surface 20 opposite the exhaust inlet acts to further dissipate the exhaust flow by introducing a normal shock wave into the flow, tending to deflect the flow out of its original path and distribute it more uniformly around the container and out of the orifices. The deflector surface acts to reduce the potential pressure of the supersonic exhaust significantly.

FIG. 4 illustrates a modified embodiment of the device in which a deflector surface is provided by a separate deflector plate 22 instead of by the wall of the container itself. The deflector plate 22 has a slightly curved front face facing towards the inlet 12 in the path of the incoming exhaust flow, and is mounted on supports 24 which space it in front of the container wall opposite the inlet. Plate 22 will also tend to produce a normal shock wave 26, deflecting and further dissipating the exhaust flow into the container. The presence of plate 22 introduces a more turbulent and thus more dissipated flow.

The internal surfaces of the device, and the surface of any separate deflector plate mounted in the device, may be coated with ablative or heat absorbing material to protect them from impingement heating.

Although a preferred enbodiment of the invention has been described above by way of example, it will be understood by those skilled in the field that modifications may be made to the disclosed embodiments which are within the scope of the invention as defined by the appended claims.

I claim:

1. An exhaust dissipator device for connection to a rocket exhaust, comprising:
   a container of elongate shape having a unique central longitudinal axis and defining an enclosed chamber having an inlet at an intermediate point in the length of the container for connection to a rocket exhaust to direct rocket exhaust flow into the container in a direction transverse to the central longitudinal axis of the container and a plurality of exhaust orifices spaced around the container for exhaust flow out of the container;
   each orifice comprising a tapered nozzle of area increasing outwardly from the interior of the container; and
   a solid deflector surface in said container in the direction of exhaust flow into the container for deflecting flow in a direction generally normal to the original exhast flow direction.

2. The device according to claim 1, wherein said container is cylindrical and said inlet is positioned in the cylindrical surface of the container at substantially the mid-point in its length.

3. The device according to claim 1, wherein said deflector surface comprises a generally flat, slightly curved deflector plate positioned facing said inlet and spaced in front of a portion of the inner wall of said container opposite said inlet.

4. The device according to claim 1, wherein said deflector surface is coated with ablative material.

5. The device according to claim 1, wherein the entire internal surface of said container is coated with ablative material.

6. The device according to claim 1, wherein the total area of the exhaust orifices is sufficient to provide an internal pressure in the container less than half the rocket chamber pressure of the rocket to which the device is connected.

7. An exhaust dissipator device for a rocket exhaust, comprising:
   a cylindrical container defining an enclosed volume having an inlet for connection to a rocket exhaust and a plurality of exhaust orifices of smaller dimensions than the inlet spaced around and along the length of the container for exhaust flow out of the container in a plurality of different directions;
   the container having said inlet at an intermediate point in its length to direct rocket exhaust flow into said container in a radial direction generally transverse to the longitudinal axis of said container; and
   a solid deflector surface in said container wall opposite said inlet for deflecting exhaust flow out of its inlet direction and towards the opposite axial ends of said container.

* * * * *